March 10, 1970  A. L. HUBBARD  3,499,493
SOIL RENOVATOR AND MULCHER

Filed May 19, 1967  2 Sheets-Sheet 1

INVENTOR.
ALBERT L. HUBBARD
BY
ATTORNEY

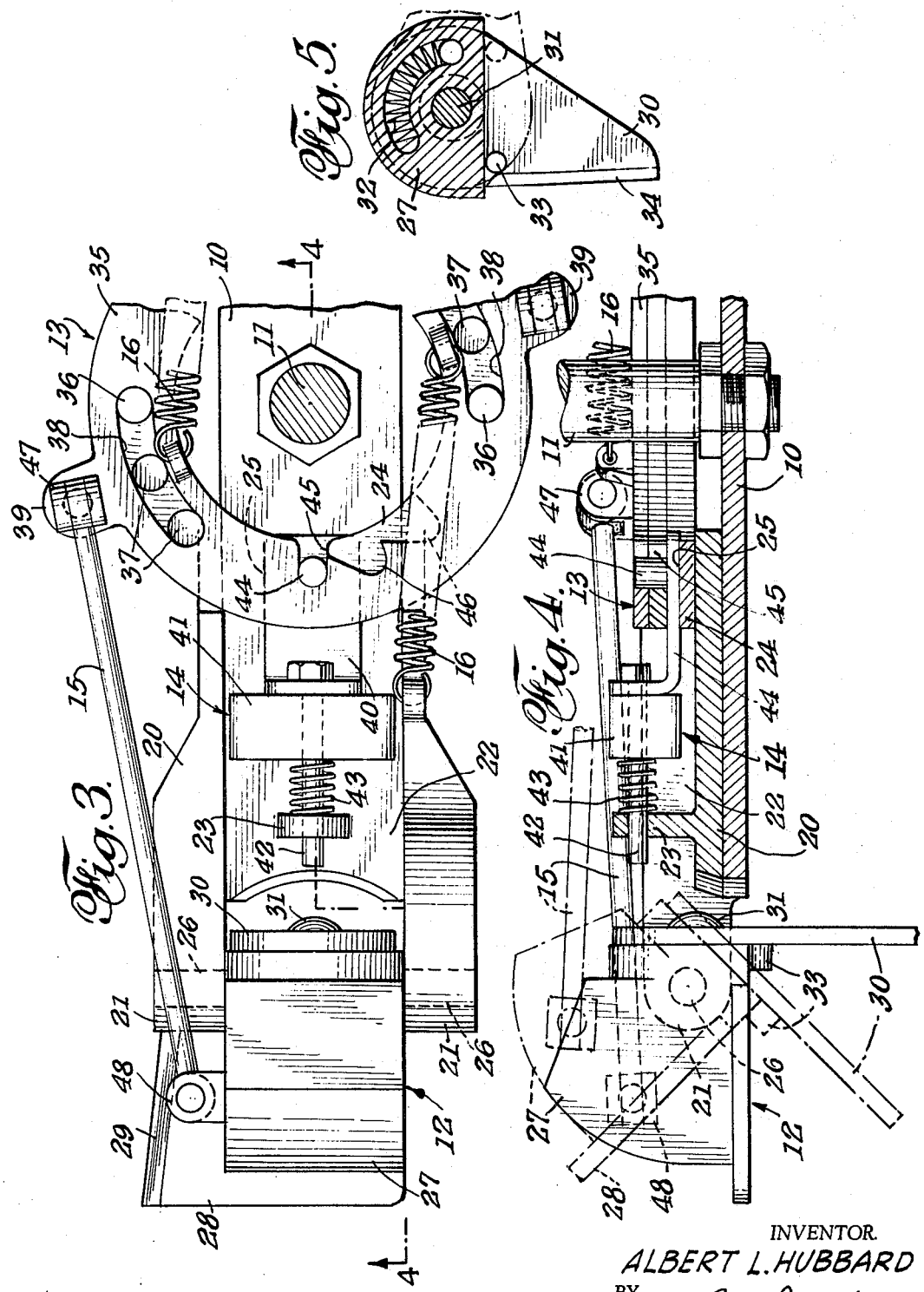

United States Patent Office 3,499,493
Patented Mar. 10, 1970

3,499,493
SOIL RENOVATOR AND MULCHER
Albert L. Hubbard, 4721 Clover Drive, Apt. 2,
Oxnard, Calif. 93030
Filed May 19, 1967, Ser. No. 639,749
Int. Cl. A01b 45/00, 33/06, 33/10
U.S. Cl. 172—45                              7 Claims

ABSTRACT OF THE DISCLOSURE

A rotary device having pivoted centrifugally movable mulching blades, with adjustable movement-limiting means, centrifugally moved to lock the blades at the angle to which the movement-limiting means has been pre-set.

Cross-reference to related application

The present improvements constitute synchronous means for moving and locking the blades of applicant's co-pending application, titled "Lawn Renovator," filed Dec. 7, 1964, Ser. No. 416,487, allowed and about to be patented May 23, 1967, Patent No. 3,321,026.

Background of the invention

Said co-pending application constitutes the background for this invention, in that the blades therein had no definite operating angle other than that imposed by centrifugal force on counterweights mounted on the blades. Said force being a function of the speed of rotation of the device, the blade angles could not otherwise be controlled. An object of this invention is to employ centrifugal force to move the mulching blades to different operating angular positions, and use the same force to lock the position, as predetermined in advance of operation.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts; which will more fully appear in the course of the following description, which is based on the accompanying drawings. However, said drawings merely show, and the following description merely describes, one embodiment of the present invention, which is given by way of illustration or example only.

Summary of the invention

The soil renovator and mulcher of this invention comprises, generally, a horizontal bar 10 mounted at its middle on a vertical driven shaft 11, a counterweighted renovator member 12 mounted on each end of said bar, control and adjustable synchronizing means 13 mounted on said bar at the middle thereof, centrifugally actuated locking means 14 engaged with the means 13, a link 15 connecting each renovator member 12 with said synchronizing means 13, and a spring 16 to return the synchronizing means 13 to initial position upon cessation of centrifugal forces on the renovator.

Brief description of the drawings

In the drawings, like reference characters designate similar parts in the several views.

FIG. 3 is an enlarged plan view of the left hand portion of the renovator in one operating position thereof.

FIG. 4 is a longitudinal sectional view as taken on the line 4—4 of FIG. 3.

FIG. 5 is a cross-sectional view, to an enlarged scale, as taken on the line 5—5 of FIG. 2.

Description of the preferred embodiment

Figure 1:
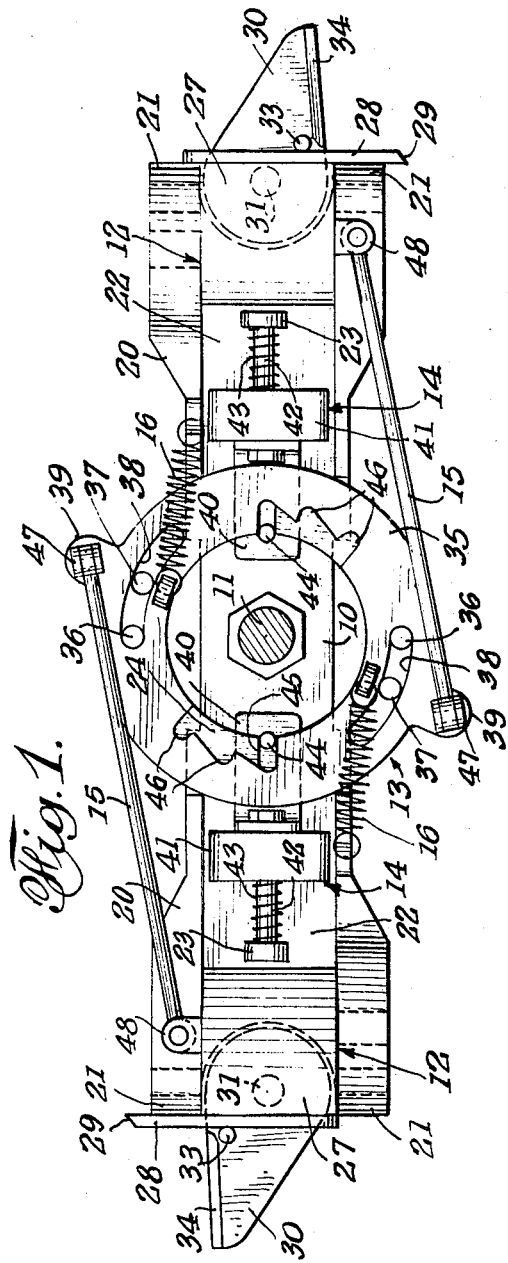
FIG. 1 is a plan view of the present renovator in a position of rest.
Figure 2:
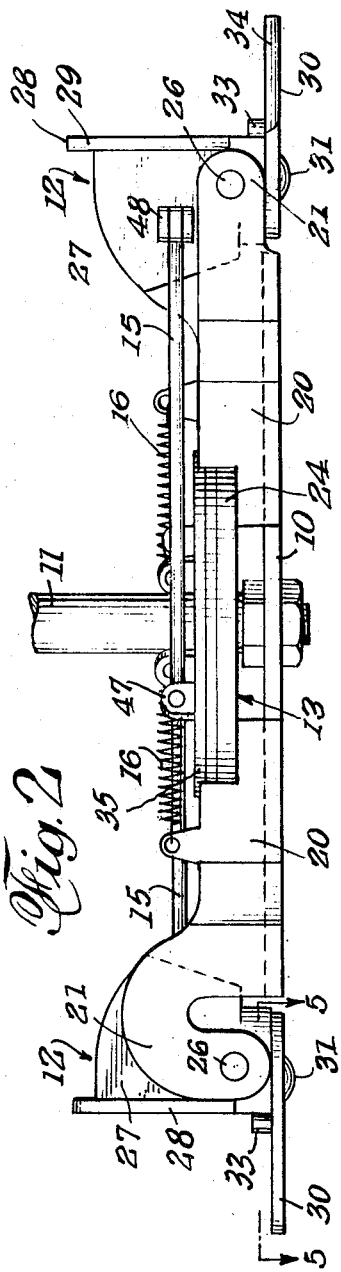
FIG. 2 is a side elevational view thereof.

The shaft 11 represents the high-speed driven member of a lawnmower or other similar machine mounted for guided movement along the ground.

The bar 10, at each end, is shown with a casting 20 that terminates in a pair of transversely spaced bearing lugs 21 defining a channel 22 in which a guide ear 23 is provided. At the middle of the bar and coaxially encircling the shaft 11, a ring 24 is affixed, the same, along the longitudinal medial line of the bar 11, being provided with aligned guide grooves 25.

The renovator members 12, by trunnions 26 journalled in the bearing lugs 21, are pivotally mounted for movement in a vertical plane around the axes afforded by said trunnions.

Each renovator member 12 comprises a weight 27 fitted between the respective pairs of bearing lugs 21, provided with a fixed blade 28 which, at rest, has a transverse vertical position with its cutting edge 29 at the forward edge (the present renovator bar 10 having a clockwise rotation as viewed from above), and a pivotally mounted mulching blade 30 on a pivot 31 and biased by a spring 32 (FIG. 5) to extended mulching position as limited by an abutment 33. In the event the renovating edge 34 encounters an obstruction, said blade 30 may retract on its pivot 31, but the spring 32 is otherwise strong enough to retain the blade in renovating position. It will be clear that the renovator members 12 will swing outwardly on the pivots so the blades 28 thereof will move from retracted vertical positions angularly forward and downward, and the blades 30 will move from normal horizontal positions angularly rearward and downward, as indicated in FIG. 4.

The control and adjustable synchronizing means 13 comprises a rotationally adjustable ring 35 superimposed on the fixed ring 24, and a pair of pins 36 selectively positioned in seats 37 in the fixed ring 24 are engaged in arcuate slots 38 in the ring 35. The ends of said slots, by engagement with the pins 36 as selectively positioned in the seats 37, limit the degree of rotative movement of said ring 35. Diametrically opposed ears 39 are provided on ring 35.

The locking means 14 is shown as a longitudinally movable slide 40 guided in each of the grooves 25, a weight 41 lighter than the weight 27, affixed to the outer end of each slide, a stem 42 extending from each said weight and guided in each respective ear 23, and a spring 43 around each stem 42 between each weight 41 and its related ear 23, to bias the slides 40 inwardly toward the axis of shaft 11. The inner end of each slide 40 is provided with a pin 44 that is engaged in a slot 45 in the fixed ring 24, and the ring 35 is provided on diametrically opposite sides thereof with a set of circumferentially arranged notches 46 which, according to the angular position of ring 35, are selectively receptive of the pins 44 to lock the ring 35 in fixed position.

One end of each link 15, by means of a clevis 47, is connected to an ear 39 of ring 35, and the opposite end, by means of a clevis 48, to one of the weights 27 of the renovator 12. It will be clear that the links 15 fixedly hold the weights 27 when the pins 44 lock the ring 35, as above described.

The springs 16 connect diametrically opposite parts of said ring 35 to the opposite castings 20 and, upon retraction of the pins 44 from engagement with the notches 46, act to turn said ring clockwise, thereby retracting the renovator members 27 to initial non-operating positions.

It will be seen that the notches 46 are formed as ratchet teeth that act on the pins 44 to retract the lighter-weight members 41 as the centrifugal force on the heavier weights 27 swings them outwardly. When the pins 36, as pre-set, arrest the rotational movement of the ring 35, the angular disposition of the renovator members is reached. Retraction of the locking pins 44 from the notches in which they are engaged cannot be attained until rotation of the bar 10 slows sufficiently to allow the springs 43 to retract the weights 41, causing release of the ring 35 so the springs 16 can retract the same and, therefore, return the weights 17 to retracted position.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A soil renovator and mulcher having a horizontal elongated bar rotational around a vertical axis, comprising:
   (a) a counterweighted renovator member pivotally mounted on each end of said bar and movable under centrifugal force in an outward and downward direction during rotation of the bar,
   (b) means rotational on said axis connected to said counterweighted members to limit the degree of said pivotal movement of said members, and
   (c) centrifugally actuated means to lock the counterweighted members in their pivotally moved positions.

2. A soil renovator and mulcher according to claim 1 in which the mentioned rotational means includes a rotationally adjustable ring, a link connection between said ring and each said means, and the centrifugally actuated means being weighted to move under centrifugal force to ring-locking position.

3. A soil renovator and mulcher according to claim 2 in which each renovator member comprises:
   (a) a pivoted weight, and
   (b) two blades, one fixed to the weight and the other pivotally mounted thereon.

4. A soil renovator and mulcher according to claim 3, said blades being at right angles to each other with the fixed blade intersecting the pivotally mounted blade.

5. A soil renovator and mulcher according to claim 2 in which the centrifugally actuated locking means comprises:
   (a) aligned slides provided with weights subject to centrifugal force to move said slides oppositely in outward directions,
   (b) a locking pin on each slide, and
   (c) ratchet means engaged with the pins to control movement of the ring.

6. A soil renovator and mulcher according to claim 5 in which the renovator members turn the ring in one direction, return springs return said ring in the opposite direction, and the ratchet means comprises ratchet teeth.

7. A soil renovator and mulcher according to claim 6 in which the ratchet teeth define recesses into which the locking pins engage, said recesses being circumferentially spaced.

References Cited

UNITED STATES PATENTS

| | | | |
|---|---|---|---|
| 2,529,797 | 11/1950 | Cauble | 56—295 |
| 2,545,173 | 3/1951 | Shaw | 172—59 XR |
| 2,720,071 | 10/1955 | Watanabe | 172—96 XR |
| 2,740,249 | 4/1956 | Stearns | 56—295 |
| 3,117,633 | 1/1964 | Hosek | 172—96 XR |
| 3,177,640 | 4/1965 | Mott | 172—45 XR |
| 3,321,026 | 5/1967 | Hubbard | 56—295 XR |

EDGAR S. BURR, Primary Examiner

U.S. Cl. X.R.

30—264, 347; 56—295; 172—92, 96, 525, 546, 657